United States Patent [19]
Brinkmeyer et al.

[11] Patent Number: 5,619,573
[45] Date of Patent: Apr. 8, 1997

[54] VEHICLE SECURITY DEVICE WITH ELECTRONIC USE AUTHORIZATION CODING

[75] Inventors: Horst Brinkmeyer, Waiblingen; Michael Daiss, Filderstadt; Günter Schwegler, Weinstadt; Bertolt Krüger, Bonn, all of Germany

[73] Assignee: Mercedes-Benz AG, Germany

[21] Appl. No.: 415,374

[22] Filed: Apr. 3, 1995

[30] Foreign Application Priority Data

Apr. 1, 1994 [DE] Germany ............... 44 11 449.4

[51] Int. Cl.$^6$ ............... H04L 9/00; H04L 9/30
[52] U.S. Cl. ............... 380/23; 380/25; 380/30; 380/49; 380/50; 340/825.31; 340/825.34
[58] Field of Search ............... 380/21, 23, 25, 380/30, 49, 50, 54; 340/825.31, 825.34

[56] References Cited

U.S. PATENT DOCUMENTS

| | | | |
|---|---|---|---|
| 4,405,829 | 9/1983 | Rivest . | |
| 4,509,093 | 4/1985 | Stellberger | 340/825.31 X |
| 4,692,762 | 9/1987 | Lewiner et al. | 340/825.31 X |
| 4,786,900 | 11/1988 | Karasawa et al. | 340/825.31 |
| 5,365,225 | 11/1994 | Bachhuber | 340/825.31 |
| 5,508,692 | 4/1996 | Wolfram | 340/825.31 |

FOREIGN PATENT DOCUMENTS

| | | | |
|---|---|---|---|
| 2911828A1 | 10/1980 | Germany | E05B 65/36 |
| 3225754A1 | 7/1982 | Germany . | |
| 3234539A1 | 3/1984 | Germany | E05B 49/00 |
| 3313098C1 | 10/1984 | Germany | E05B 49/00 |
| 2282687 | 4/1995 | United Kingdom | B60R 25/00 |

OTHER PUBLICATIONS

British Search Report dated Jun. 15, 1995.
"Diebstahlschutz Für das Auto" [Protecting Cars Against Theft] from Temic Telefunken microelektronik GmbH dated Aug. 1993.
"A Method for Obtaining Digital Signatures and Public–Key Cryptosystems," R.L. Rivest et al., Communications of the ACM, vol. 21, No. 2, Feb. 1978, pp. 120–126.
"RIPE Integrity Primitives Part I, Final Report of RACE 1040," RIPE Consortium, Report CS–R9324 Apr. 1993.
Part III Recommended Integrity Primitives, Chapter 3 RIPEMD, pp. 67–109.
Part III Recommended Integrity Primitives, Chapter 7 RSA, pp. 174–190.

*Primary Examiner*—Bernarr E. Gregory
*Attorney, Agent, or Firm*—Evenson, McKeown, Edwards & Lenahan P.L.L.C.

[57] ABSTRACT

The invention provides a vehicle security device with an electronic use-authorization coding arrangement for identifying authorized access to the vehicle. The vehicle security device utilizes an encryption method which operates on the basis of a one-way function, so that it is only absolutely necessary to store secret code information at the key end, specifically in the form of different inverse images of a one-way function. Only the one-way function values corresponding to these inverse images need be present at the vehicle end, a reading-out of which does not permit unauthorized manufacture of a copied key because of the virtual irreversibility of the one-way function.

10 Claims, 1 Drawing Sheet

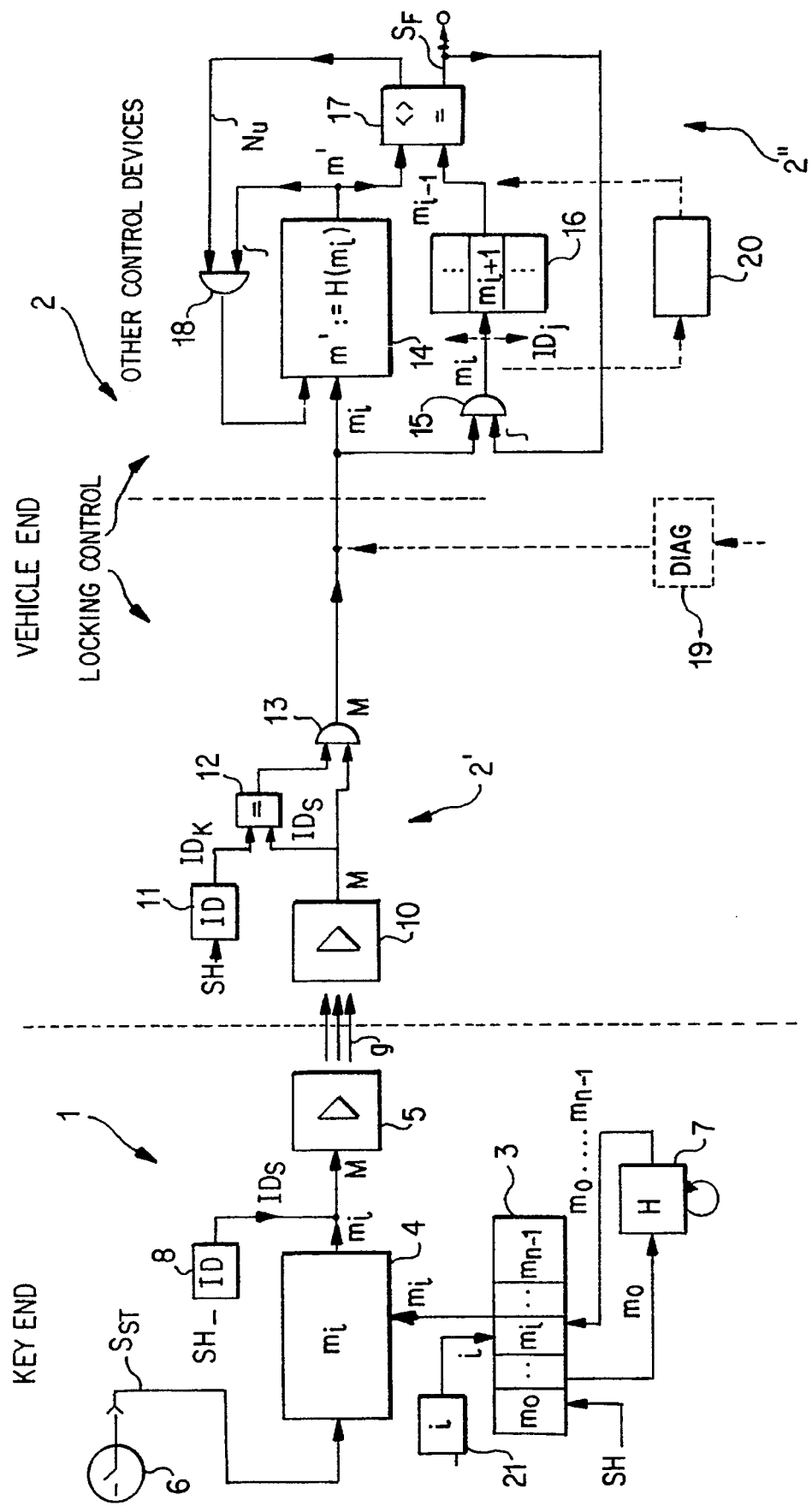

VEHICLE SECURITY DEVICE WITH ELECTRONIC USE AUTHORIZATION CODING

BACKGROUND AND SUMMARY OF THE INVENTION

The invention relates to a vehicle security device having electronic use authorization coding for identifying an authorized access to the vehicle.

Vehicle security devices of this generic type are known, such as for example, electronic disabling facilities which operate according to a so-called alternating code method for protecting the vehicle against unauthorized use by a third party. Such a system is described in the company brochure "Diebstahlschutz für das Auto [Protecting cars against theft]" from TEMIC TELEFUNKEN Microelektronik GmbH dated August 1993. In comparison with fixed code methods which were customary in the past (such as described for example in German Patent Document DE-OS 29 11 828 A1), in such alternating code methods safeguarding against unauthorized use of the vehicle after one or more of the code transmission protocols have been intercepted is enhanced by the code information changing at each so-called authentication process, i.e., at each testing process of the use authorization. This code change can only be implemented from the key unit to the vehicle unit in compliance with the unidirectional code information transmission known from the fixed code method, by a secret item of base counting information and an algorithm stored both in the key unit and in the vehicle unit. By means of this algorithm the successive items of code information can be derived from the base number so that at the vehicle unit the user authorization can be tested by respectively comparing the code information produced at the vehicle unit with the code information transmitted at the key unit. Alternatively, it is known to provide both the key unit and vehicle unit, after each successful authentication, with a new, randomly selected or deterministically specified authorizing item of code information for the next authentication, cf. for example, the German Patent Document DE-OS 32 34 539 A1 and the patent document DE 33 13 098 C1. However, such controlled synchronization requires a bidirectional exchange of data which is made possible in a wireless fashion or via electrically conductive contact between the key unit and a piece of vehicle equipment which is involved in the process.

Moreover, in addition to the alternating code methods which operate during an authentication with unidirectional data transmission, so-called symmetrical encryption methods are known in which the authentication takes place by means of bidirectional data exchange, one secret coding algorithm of the same type being stored on the one hand at the key unit, and on the other hand, at the vehicle unit, respectively. This algorithm generates a respective item of code information in response to an item of input information, e.g., an item of random counting information, fed to both units, the key unit code information being subsequently transmitted to the vehicle unit and tested there for corresponding with the code information generated at the vehicle unit. A method of this kind is described in the German Patent Document DE-OS 32 25 754 A1.

Consequently, all the above mentioned methods require the storage of an item of secret information at the vehicle unit. Thus, there is not only a certain risk of unauthorized reading-out of this item of secret information from the vehicle end, but additional care must be taken that such secret data information is protected at the vehicle unit, which makes corresponding logistic outlay necessary at the vehicle manufacturer's and in garages in which this secret vehicle-specific information is to be fed into pieces of replacement equipment.

One object of the present invention is to provide a vehicle security device of the type mentioned above which affords a relatively high degree of protection against unauthorized use of a vehicle by a third party, together with a relatively low degree of outlay (in particular even by unidirectional data transmission) and convenient control.

Another object of the invention is to render it impossible for an unauthorized person to intercept an authentication process or read out an item of vehicle end code information, and subsequently operate the vehicle by using the intercepted or read-out information to authenticate such use.

Still another object of the invention is to provide a security device of the type described, in which it is unnecessary to store secret items of information at the vehicle end.

These and other objects and advantages are achieved by the vehicle security device according to the invention, which offers a relatively high degree of protection against unauthorized use of the vehicle by a third party with a comparatively small outlay. In particular, a vehicle-end storage of an item of secret information is not absolutely necessary, which saves on security logistics at the vehicle manufacturer's and in garages and avoids associated security risks. In addition, in the security device according to the invention, copied keys with which successful authentication would be possible cannot be manufactured by reading out the code information contained at the vehicle end. Furthermore, the omission of logistical security measures is a particularly important factor if multiple pieces of equipment are involved in authentication at the vehicle end so that it is uneconomical to bypass the disabling facility simply by replacing one or a small number of pieces of equipment involved in authentication.

The code security of the authentication according to the invention is based on an inherent property of a mathematical "one-way function". A one-way function is defined here as a mathematical function for which the function value associated with a given inverse image can be determined unambiguously and comparatively easily from its domain, while it is not possible, even with the maximum practically available computational power, to find an inverse image associated with a given one-way function value. (In mathematics the term "inverse image" refers to a set of input values used to generate an associated set of function values by means of a function f. If $y=f(x)$, then a value x, associated with a particular function value y, may be referred to as the inverse image of $y_1$. That is $x_1=f^{-1}(y_1)$.) Thus, the algorithm for calculating a one-way function value associated with an inverse image is comparatively simple, but on the other hand, the determination of an inverse image which is associated with a given value of a one-way function is not possible within an available time period and a practically realizable computational outlay.

The latter proposition, of course, depends in large measure on the computer capacity available. At the current state of computer technology, such one-way functions, e.g., in the form of so-called "hash functions", are known and are principally used for protecting messages in cryptography, it being possible nowadays for approximately $2^{50}$ calculation and memory processes of hash values to be attained as the upper limit for the computational outlay which can be practically coped with.

The hash function, sometimes called a message-digest algorithm, compresses messages of arbitrary length to a 128-bit output block, that is called the fingerprint hashcode, hash value or message-digest of the message. It is regarded as computationally infeasible to produce two messages having the same hashcode, or to produce any messages having a given prespecified target hashcode. Hash functions with these properties are known and used in message authentication applications such as the protection of the integrity and the origin of data stored or transmitted using secret-key or public-key techniques.

Because of the virtual irreversibility of one-way functions, the one-way function values at the vehicle unit do not have to be treated as secret, since even unauthorized reading-out of the said values from the vehicle would not permit an unauthorized person to discover the associated inverse images and thus produce an electronic copy of the key. Security of the system against interception and exploitation of an authentication attempt is also provided by the fact that a new item of inverse image code information is transmitted for each authorization attempt. Depending on the result of the comparison of actual and desired authorization information, the authentication unit in the vehicle outputs an item of use-enabling information which in the case of a positive authentication attempt leads to an associated electronic disabling facility being deactivated, and in the case of a negative (unsuccessful) authentication attempt, causes it to remain activated. In the latter case, the electronic disabling facility ensures that after the ignition key is withdrawn, at least one piece of equipment which is in the vehicle and is required for access to the vehicle or for the operation of the vehicle (for example, a locking control, an engine control device, etc.) remains disabled.

One embodiment of the invention provides the inverse images stored at the key unit in an advantageous, simple manner by forming this sequence of values by successively executing the one-way function, after which the sequence is read out backwards during operation of the key. (That is, the last inverse image to be determined becomes the initial one.) At the vehicle end, this arrangement provides the technical advantage in terms of memory that not all the one-way function values associated with the inverse images must be stored. Instead, the initial storage of the one-way function value which is associated with the first inverse image to be transmitted is sufficient to provide the desired authorization information, after which, whenever there is a successful authentication using the same key unit, the stored information is overwritten with the inverse image information transmitted for this authentication, since a previously transmitted inverse image is always in fact the one-way function value of the inverse image transmitted subsequently.

In another embodiment of the invention, memory space is saved at the key unit in that not all the inverse images required over the service life of the key unit are stored, but rather just samples at selected intervals throughout the entire sequence of images, and a current value range between two samples. Whenever a current range has been used up, the one-way function algorithm stored at the key unit can be used to generate and store a new current range starting from the next sample by recursive application of the one-way function.

In still another embodiment of the invention, a so-called capture range is formed at the vehicle end which makes it possible, to a prescribable degree, to synchronize the vehicle with the key unit again in the event that synchronization is lost as a result of one or more transmission activities at the key unit which were not received at the vehicle end. If the one-way function value of a received inverse image as actual authorization information does not correspond to the instantaneous vehicle-end desired authorization information, the capture range permits formation of a recursive one-way function to be executed for a prescribed maximum number of repetitions. In this process, the one-way function value which is produced each time from the previous actual authorization information serves as new actual authentication information. If correspondence is detected within the information which has been newly determined in this way, this is evaluated as a positive authentication attempt. The disabling facility is then deactivated, and the transmitted inverse image information is stored as new desired authorization information for the next authorization attempt with this key. If the capture range is selected to be as large as the power of a total inverse image sequence possible in the key unit, this additionally permits an authorizing replacement key to be incorporated into the system in an advantageously simple way, while simultaneously the replaced key automatically becomes invalid. For this purpose, according to yet another embodiment of the invention, the replacement key may preferably be initialized by means of a single secret starting value stored in a central key processing facility for the formation of one-way function values for the initialization of the first key and of all further keys which replace the previous key successively as required.

Yet another embodiment of the invention uses one of the hash functions known from cryptography, specifically a RIPEMD algorithm, which, according to the current state of cryptography, can be assumed to have the required one-way function property.

In a further embodiment of the invention, a plurality of pieces of equipment at the vehicle end are involved in parallel in the authentication, for which purpose they are advantageously connected via a common data bus. This decentralized distribution of authentication which can extend over all the vehicle relevant pieces of equipment, makes mechanical bypassing of the disabling facility (by replacing equipment) substantially more difficult, since all of the pieces of equipment affected by the authentication and the disabling facility would then have to be replaced in order to make it possible for the vehicle to be used by an unauthorized person who does not have the means of achieving successful authentication. The pieces of equipment involved, in particular control devices for the electronic system of the vehicle, can be selected such that replacing them would require an unreasonably high outlay in relation to the benefit gained, and would therefore be unattractive.

In another embodiment of the invention, locking control of the vehicle is included in the authentication so that not only can the vehicle not be started without authorized authentication, it cannot even be opened without violence. If further pieces of equipment are involved, they may be connected to one another, for example, by means of a data bus, and to the locking control. A single vehicle-end receiver for the data transmitted at the key unit is then sufficient, it being possible for the receiver to be assigned, for example, to the locking control.

Still another embodiment of the invention has the advantage that, in the initial identification testing of the vehicle and the key, it is determined whether legitimized hardware units are connected to one another before the actual authentication process is carried out. In this manner, unnecessary activation of authentication operations, which cannot succeed because of an incorrect key/vehicle combination, are avoided.

A final embodiment of the invention permits the use of multiple keys for the vehicle in a manner which is advantageous for circuit technology, and still maintains the one-way function coding algorithm.

Other objects, advantages and novel features of the present invention will become apparent from the following detailed description of the invention when considered in conjunction with the accompanying drawings.

BRIEF DESCRIPTION OF THE DRAWING

The single figure shows a block diagram of a vehicle security device according to a preferred embodiment of the invention, with electronic use-authorization testing by means of unidirectional transmission of code data.

DETAILED DESCRIPTION OF THE DRAWINGS

The vehicle security device according to the invention, contains at the user end a plurality of, e.g., eight, electronic keys (1) (one of which is shown by way of example), and at the vehicle end a plurality of pieces of equipment (2) which are involved in protecting vehicle use. One of these pieces of equipment is a locking control which is illustrated as representative of the other pieces of equipment in the figure. (The other pieces of equipment may be the other control devices of the vehicle's electrical system.) Here, the circuit component (2'), (illustrated in the figure at the vehicle end, to the left of the right-hand dotted dividing line) is present only in the locking control, while the circuit component (2") which is located to the right of this dividing line is present in an identical form for all the pieces of equipment involved. All the pieces of equipment (2) involved in protection communicate with one another and with the receiver-end circuit component (2') present in the locking control via a CAN bus (not shown) or alternatively via another data exchange link in the vehicle. Key units and pieces of equipment (1, 2) are each equipped here with a processor chip in which the function units which are each illustrated in block form in the figure and described below are implemented largely by means of software.

Each of the key units (1) has a transmitter (5) by which data can be transmitted unidirectionally in coded form via an infrared link (9) to the vehicle where they are received and subsequently decoded by a receiver (10) in the input circuit component (2') of the locking control (2). Furthermore, each key unit (1) has a unit (7) for recursively generating, in a known manner, one-way function values of a Hash function (H) such as is used, for example, in cryptography. In the present embodiment, the RIPEMD function, a well known example of a hash function ("Ripe Integrity Primitives, Final report of RACE Integrity Primitives Evaluation (R1040) (June 1992), Part III Recommended Integrity Primitives, Chapter 3 RIPEMD, pp. 67–109"), is used specifically as hash one-way function. The bit length of a RIPEMD function value is 16 bytes, however, it is sufficient for the present purpose of providing vehicle security to transform the 16 byte value into a shortened 8 byte value by means of a suitable algorithm in order to save memory space.

With the hash function value generating unit (7), a number n of values are produced by repeated application of the hash function, starting with a starting value ($m_0$), and stored as inverse images in an inverse image memory (3) which can be read out backwards, i.e., starting with the last value (($m_{n-1}$) of the inverse image sequence ($m_0, \ldots, m_{n-1}$) successively into a buffer (4) by means of a counter (21). The number n determines the maximum number of authentication attempts which can be triggered by the key unit (1) during its service life and is to be selected appropriately; for example, n=100,000 for approximately 20 activations per day with a service life of the key of approximately 10 years. The reading out of the buffer (4) can be controlled by means of a starting signal ($S_{ST}$) which is generated by means of a user key (6).

In order to store hardware identification data which comprise a vehicle-specific and a key-specific item of information, each key unit (1) has an identification data memory (8) whose data is combined by the key unit (1) with the inverse image information ($M_i$) originating respectively from the buffer (4) to form the user code information (M) to be transmitted as a message.

At the vehicle end the information input-end circuit component (2') of the locking control (2) contains, in addition to the receiver (10), an identification data memory (11), an identification data comparator (12) and a gate function (13), each implemented in the form of software. (It is, of course, apparent that hardware implemented embodiments are also possible within the scope of the invention.) The comparator (12) compares the identification data information ($ID_S$) extracted in this locking control device circuit component (2') from the receiver user code information (M) with the identification data information ($ID_K$) stored in the vehicle-end identification data memory (11), and supplies its output signal to a control input of the gate (13) whose other input is supplied with the user code information signal (M). Optionally, a diagnostic interface (19) can be connected to the locking control (2), as indicated in the figure by dotted lines.

The locking control circuit component (2"), which is shown in the figure to the right of the right-hand dotted dividing line, is also present in identical form in all the other pieces of equipment (2) involved in the vehicle security system. It contains (again in the form of software) a unit (14) for calculating hash function values and a gate function (15), to both of which the inverse image information ($m_i$) contained in the user code information (M) is fed. The output of this gate (15) is connected to a desired authorization information memory (16) with a number of memory locations corresponding to the number of key units (1), the individual memory locations being capable of responding independently of the detected key identity ($ID_j$), i.e., the key number. The output of this memory (16) is in turn connected to an input of a comparator block (17) to which the output signal (m') of the hash function value generating unit (14) can be fed via a further input. This output signal (m') is furthermore fed to a further gate block (18) whose control input is supplied with a non-correspondence signal ($N_U$) of the comparator (17).

When correspondence is detected by the comparator (17), it generates a use-enabling signal ($S_F$) to cancel a state which blocks the operational capability of the software of the respective piece of equipment (2) and is part of an electronic disabling facility which keeps all these pieces of equipment disabled. The use-enabling signal ($S_F$), which represents successful authentication (i.e., use authorization testing) does not leave the associated piece of equipment, and preferably does not even leave the chip area, which provides a high degree of security against unauthorized external feeding-in of the use-enabling information. It is also fed as a control signal to the gate block (15), which is supplied with the transmitted inverse image information ($m_i$), in order to permit this information to be stored as new desired authorization information.

In order to carry out special functions via the diagnostic interface (19), possibly connected to the locking control, or a key unit (1) an additional desired authorization information memory (20) for special functions may be provided parallel to the normal desired authorization information memory (16), as indicated by broken lines in the figure.

As mentioned above, all the pieces of equipment (2) involved in the authorization process are simultaneously also involved in an electronic disabling facility which is activated each time the ignition is switched off, and can be deactivated again by a subsequent successful authentication process. Since the same authentication operations are carried out in all these pieces of equipment (2), all such units (2) become operational again simultaneously in the event of an authorized request for use, while in the event of an unauthorized request for use, at least one remains disabled. The distribution of the authentication process to all these pieces of vehicle equipment and the corresponding disabling of the same has the advantage that the vehicle cannot continue to be used simply by replacing one or a small number of pieces of equipment by bypassing the necessity for authentication. Instead, all these pieces of equipment would have to be replaced, which would be so expensive that such an attempt at unauthorized use by a third party would be unattractive.

Details are given below on the mode of operation of the vehicle security device constructed as described above.

The entire sequence begins initially before the vehicle is started up with the necessary initialization process at the key manufacturer or a central key processing facility (SH) designed for this purpose. Here, a secret random value ($r_0$) is initially produced for each key on an individual basis. The secret inverse starting value ($m_0$) is then calculated from this random value ($r_0$) by multiple, (e.g., 400,000) successive application of the hash function and fed into the inverse image memory (3) in the respective key unit (1). The initially unused hash function values between the secret initial random value ($r_0$) and the inverse starting value ($m_0$) can serve as resources for a key replacement (described further below), for which purpose the associated initial random value ($r_0$) is stored in a protected memory of the control key processing facility (SH).

In addition to the inverse starting value ($m_0$), during the production of the key unit (1) the identification data ($ID_s$) are also fed into the associated memory (8). These data also contain, in addition to vehicle-specific data, a key number which distinguishes the respective key units which are simultaneously valid for one vehicle. With the exception of the key number, the identification data of the key units (1) which are simultaneously valid for one vehicle are identical and consequently form a kind of key set number. In parallel with this, the identical identification data are made available by the central key processing facility (SH) to be fed into the associated memory (11) of the locking control. In addition, in the central key processing facility (SH) during the initialization, starting from the inverse starting value ($m_0$) the next n recursive hash function values ($H^j(m_0)$; J=1, ... n−1) are calculated in advance and the final value ($m_n$) obtained is passed on (as discussed below), for use as a key-specific starting value for the desired authorization information for the vehicle-end initialization of the associated memory location of the respective desired authorization information memories (16), together with the identification data to the manufacturer of the vehicle.

Using the initialization data received from the central key processing facility (SH) the vehicle-end initialization is carried out by the manufacturer of the vehicle by feeding a vehicle-specific hash function value, which is part of a hash function value sequence also generated in the central key processing facility (SH), into the special hash function value memory (20), specifically depending on the security requirement to terminate production at the vehicle manufacturer or during the installation of the equipment on the production line or in the garage. In order to initialize the desired authorization information memory (16), in the course of production each memory location, assigned to a specific key unit (1), of these memories (16) of all the pieces of equipment (2) involved is loaded with the starting value ($M_n$) which is made available for this purpose on a key-specific basis by the central key processing facility (HS). For this purpose, the operator must obtain authorization via the diagnostic interface (19) and the hash function value which is stored in the special function memory (20) on a vehicle-specific basis, before the operator can perform the first initialization by overwriting the initial value zero with the key-specific initial value ($m_n$) of the desired authorization information. (The memory locations of the desired authorization information memories (16) are protected against normal overwriting as long as they contain the value zero.)

The special function memory (20) serves here as a transport protection for the pieces of equipment but, depending on requirements, may permit further special functions to be carried out. During equipment initialization it must be ensured that the zero values of all the memory locations for the different keys of one set are overwritten in order to prevent later unauthorized initialization by a third party. Alternatively, it is possible to pass on the starting value ($m_n$) of the desired authorization information to the vehicle end for initialization when a first key actuation occurs.

If a piece of equipment (2) which is involved in the process is replaced during repairs, there may additionally be provision to initialize the newly inserted unit with the starting values, which are present in the other units, by means of the CAN bus, which automatically ensures that all the starting values are overwritten to zero. In order to distinguish whether the information (M) which is fed to a piece of equipment (2) contains a normal authentication or a special function operation, the fed-in information (M) has, in addition to the identification data which comprise approximately 8 bytes and the inverse image information which is shortened to 8 bytes, additionally a function code for which one data length of 1 byte is sufficient.

After initialization has taken place, each key unit (1) generates with the first connection to the power supply the other n−1 values, via its hash function value generating unit (7) from the stored starting value ($m_0$) by repeated application ((n−1) times) of the hash function to the respective function value previously obtained and stores the obtained value sequence as an inverse image sequence in the appropriate memory (3) for successive reading-out backwards, the associated counter (21) being initially set to the value n−1 and being reduced by one each time the activation key (6) is actuated.

Since the storage of these (for example, 100,000) 16-byte values requires appropriate space, the following memory space-saving alternative process is possible. Selected values of the generated hash function value sequence ($m_0$ to $m_{n-1}$), (for example, only every hundredth value) are permanently stored in the memory (3) as samples. Also, the present section of the value sequence ($m_0$ to $m_{n-1}$) between two samples (which consists e.g., of 100 values in each case) is stored in the memory (3) so that in this way at any time only 1100 8-byte values have to be stored in the memory (3). As soon as the end of an instantaneous value sequence section is reached as a result of ongoing use of the key, the formation (7) of hash function values is activated with the next sample as input information in order to generate the next value sequence section between two samples, after which the used-up value sequence section is overwritten with the newly calculated one.

From the point of view of low memory requirement, a uniform memory distribution for the samples and for the region between two samples is even better. In that case, each memory component then contains a number of memory locations which corresponds approximately to the root of the power (n) of the entire value sequence ($m_0$ to $m_{n-1}$). In order to make the memory requirement as low as possible it is alternatively possible to keep only the initial value ($m_0$) stored and to carry out again a repeated formation of hash function values starting from this starting value ($m_0$) after each activation of the key and to repeat this formation successively one time less in each case and then to feed the respective final value directly into the buffer (4). Other distributions (e.g., logarithmic sample selection) are, of course, equally possible.

This terminates the preparations for normal authentication operation with the vehicle security device, in which a user attempts to demonstrate to the vehicle his authorization for use, thus opening the vehicle and cancelling the disabling facility which is activated when the vehicle is parked. Such an authentication process is initiated by actuating the starting button (6) of a key unit (1), the starting signal ($S_{ST}$) which is thus generated causing the inverse image ($m_i$) which is then present in the buffer (4) to be read out, the said inverse image ($m_i$) being subsequently passed on together with the key unit identification ($ID_s$) as user code information (M) to the transmitter (5) and fed from there via the infrared transmission link (9) to the vehicle-end receiver (10). Here, the identification data information ($ID_s$) is initially extracted from the user code information (M) in the locking control data ($ID_K$). If the required hardware identity of a key (1) which is intended for the vehicle is not present, the user code information (M) is prevented from being passed on to the CAN bus and from there to the further pieces of control equipment with an item of corresponding control information to the gate function block (13), and the authentication process is aborted, without the vehicle being unlocked or the disabling facility being cancelled. If, however, the necessary hardware identity is detected, the function code information is subsequently interrogated as to whether a normal authentication process or a diagnostic process, for example, for dealing with faults, is present.

If a normal identification-tested authentication attempt occurs, the transmitted inverse image ($m_i$) is passed on as a component of the transmitted user code information (M) from the locking control via the CAN bus to all the control devices (2) involved in the process and fed there in each case to the hash function value generating unit (14) and to the gate (15). The unit (14) calculates the hash function value (m') which is associated with the fed-in inverse image ($m_i$) and passes this on as actual authorization information (m') to the comparator (17) and to the second gate (18). In the meantime, the associated key number ($ID_j$) is determined using the identification data ($ID_s$) contained in the user code information (M), and the value ($m_{i+1}$) stored in the associated memory location of the desired authorization memory (16) is read out of the other input of the comparator (17). This value ($m_{i+1}$) corresponds to the inverse image information which is fed to the control device (2) during the last preceding authentication to be carried out successfully with this key unit (1). (It is important to note in this regard that the inverse images $M_0, \ldots, M_{n-1}$ stored in the memory (3) are read out in reverse order. Thus, application of the hash function to a particular stored value ($m_i$) yields the previously transmitted value ($m_{i+1}$).)

If the comparator (17) detects correspondence of the actual authorization information and desired authorization information (m'=$m_{i+1}$), it generates the use-enabling signal ($S_F$) which on the one hand, as a control signal fed back to the gate (15) triggers the overwriting of the respective memory location by the inverse image ($m_i$) fed in during the authentication, and on the other hand, brings about, together the use-enabling information generated simultaneously in the other control devices involved in the process, the entire cancelling of the electronic disabling facility, so that all the control devices are restored to their operational state. If it is intended to save memory space in some of the pieces of equipment, there may be provision for only a portion, e.g., 2 bytes, of the entire desired authentication information ($m_{i+1}$) to be stored in the said pieces of equipment and to compare only this portion with the corresponding portion of the hash function value (m') in the comparator block (17). So that, nevertheless, faulty deactivation of the disabling facility is prevented (which could otherwise occur because of the reduced comparison, particularly with a large capture range), for at least one piece of equipment, for example, the locking control device, the complete code comparison is retained. The result of the comparison is transmitted to the devices with shortened comparison, and the generation there of the use-enabling information is associated with the presence of a positive result of the complete code comparison.

On the other hand, if the comparator function block (17) detects non-correspondence (provided that the number of successive non-correspondence has not yet exceeded the capture range by a number (N) of possible repetitions), it transmits a non-correspondence signal ($N_U$) to the gate (18) which in response feeds back the hash function values (m') generated at the output, back to the input side of the unit (14) which generates hash function values. The latter then carries out a renewed formation of hash function values using this input value (m'), the result of which is then transmitted to the comparator (17) as a new actual authorization information. This recursive generation of hash function values is continued until either the comparator (17) detects correspondence of one of the successively generated items of actual authorization information with the desired authorization information ($m_{i+1}$) present (after which, as stated above, generation is continued), or the loop repetition number has reached the maximum number (N), for example, N=100,000, prescribed by the capture range. In the latter case, either the authentication process is aborted as unauthorized and the disabling facility continues to be activated, or a new item of user code information with correct identification data arrives, so that the loop counter is reset and the generation of hash function values is continued with the newly transmitted inverse image.

As already stated in brief above, the capture range serves to restore synchronization of the key unit and vehicle end which have become out of step as a result of single or multiple actuation of the key without reception contact of the vehicle end for the associated transmission protocol. That is, the vehicle end is readjusted to the inverse image which is now present in the key (1) by means of correspondingly frequent, successive formation of hash function values within the capture range. If the capture range (N) is selected to be exactly as large as the power (n) of the sequence of inverse images, the synchronization for an authorizing key can always be restored.

By virtue of the property, typical for hash function values, that the function values are assumed to be distributed virtually with identical probability over the entire value range, and by virtue of the fact that even when a reduced algorithm with 8-byte values is used approximately $10^{20}$ function values are possible, it is extremely improbable, even with a capture range of $N=10^5$ that an unauthorized person, if he were to have somehow overcome the identification test, would achieve positive authentication by transmitting inverse function values on a trial and error basis using the capture range. In such case, it would be possible to prevent frequent attempts of this kind if appropriate by means of a corresponding time window or limit on the number of attempts within which an authorizing authentication would have to take place, while otherwise use of the vehicle would continue to be disabled in response to further authentication attempts. It is possible for such disablement to be cancelled, for example, only by the vehicle manufacturer via the diagnosis interface (19). Of course, the mode of operation of the vehicle security device proceeds in an analogous fashion for any other authentication process desired for the said device or for other key units as described above.

The selection of a capture range (N=n) which is the same size as the power of the inverse image sequence (n) also provides a very convenient way of producing a replacement key. As mentioned above, the inverse starting value ($m_0$) was generated at the key manufacturer's (SH) by the repeated formation of hash function values from a key-specific initial random value ($r_0$), for example, by application T-times, i.e., $m_0 = H^T(r_0)$ where for example $T = 400,000$. If a replacement key is to be provided, it is initialized at the key manufacturer's (SH) as was the original key, with the exception that the value $m_0' = H^{T-N}(r_0)$ is selected starting from the same initial random value ($r_0$) as inverse starting value ($m_0'$).

Now, an authentication dialogue with the vehicle is carried out using this replacement key. The replacement key first transmits the value $x = H(m'_{n-1}) = H^{n-1}(m_0') = H^{n-1}(r_0)$ to the vehicle. However, this value lies with certainty in the capture range of the vehicle end since it follows from this that $H^N(x) = H^{T+N-1}(r_0) = H^{N-1}(m_0)$. The replacement key is thus automatically interpreted by the first authentication dialogue via the capture range as an authorizing key, so that the instantaneously transmitted value (x) is simultaneously transferred into the vehicle-end desired authorization information memory (16). This in turn, simultaneously makes the original key automatically invalid since its values lie with certainty outside the capture range of the new inverse image (x). A separate disabling process for the original key which has, for example, been lost is therefore unnecessary.

With this procedure, a number T/N of replacement keys can be successively authenticated. For example, when T=400,000 and N=n=100,000 four keys which can be replaced one after the other and have the same key number are obtained. Of course, depending on requirements, an alternative way of implementing replacement keys in this field can be realized by using an additional known encryption method, such as for example, the asymmetrical RSA signature method known in cryptography (described in Annex C of ISO/IEC JTC1/SC20/WG N115, DIS 9594-8, Gloucester November 1987) or the asymmetrical DES (data encryption standard) method, especially if the capture range is selected to be smaller than the power of the inverse image sequence, so that the above technique for implementing replacement keys is not possible. Furthermore, implementation of replacement keys may be achieved by means of the diagnostic interface (19) and the special function memory (20).

The vehicle security device described herein provides security against a vehicle's being used by a third party without authorization, in a way which involves little outlay, provides a relatively high degree of protection and enables in particular the protected storage of items of secret code information at the vehicle end to be dispensed with. The apparatus according to the invention also permits a plurality of pieces of vehicle equipment to be used without logistical security problems. Furthermore, costly bidirectional data communication between the key unit and vehicle end is not essential. Specifically, 64 bits are sufficient for the hash function code and therefore the transmission time and the computational outlay are significantly lower than in the case of an equally conceivable use of the RSA method (U.S. Pat. No. 4,405,829) which, as an asymmetrical encryption method, also only requires an item of secret information to be stored at one end, but has a large word length of 512 bits and thus, in view of the computational capacities present in a vehicle, requires long computational and transmission times.

It is apparent that only the units and operations which are essential to the invention have been mentioned in this above example and further customary units and operational sequences are additionally provided, and that a person skilled in the art is capable of performing, within the scope of the invention, a plurality of modifications of this embodiment, for example, using another one-way function, application-specific changes to the stated numerical examples, dispensing with the identification test and/or the special function facility or using a chip card system instead of the infrared signal transmission. Additionally, the! invention can be realized as a system with bidirectional exchange of authentication data, in which, for example, an item of random numerical information is transmitted from the vehicle to the key unit and transmitted back XOR linked to the inverse image information and is compared for correspondence. An embodiment of this kind prevents an unauthorized person who during temporary possession of an authorizing key produces successive user code information from it from successfully obtaining authentication with respect to the vehicle using this copied key.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Vehicle security device having an electronic use-authorization coding arrangement, comprising:

a user-end key unit for successively transmitting items of user code information which differ from one another;

a vehicle-end apparatus for receiving the transmitted user code information, and generating as a function thereof an item of actual authorization information; and means for comparing said item of actual authorization information with an item of desired authorization information present at the vehicle end, and for generating an item of use-enabling information based on a result of said comparing; wherein said successively transmitted user code information comprises an inverse image for a one-way function;

the desired authorization is in each case a one-way function value associated with the inverse image contained in said item of user code information; and the determination of the actual authorization information from the received user code information includes the formation of the one-way function value associated with the inverse image contained in the received user code information.

2. Vehicle security device according to claim 1 wherein successively transmitted inverse images constitute a sequence which results from repeated application of the one-way function, such inverse images being used in reverse order with respect to said sequence to form the successive items of user code information; and the desired authorization information consists in each case of an inverse image transmitted with the user code information during a last preceding successful use-authorization testing process with the user key unit.

3. Vehicle security device according to claim 2 wherein selected sequence elements of the sequences are stored as samples, and a currently used subsequence between two samples is stored, in an inverse image memory of the key unit, and a later subsequence is respectively generated and stored in place of a previous subsequence when a last inverse image of the previous subsequence has been transmitted.

4. Vehicle security device according to claim 2 wherein an item of new actual authorization information is determined as a one-way function value of the previous actual authorization information following a negative result of comparison of actual authorization information and desired authorization information, for a prescribed maximum number of repetitions, and said new actual authorization information is compared with the desired authorization information.

5. Vehicle security device according to claim 2 wherein replacement key units which can be used in place of the key unit are provided, and the inverse images of one key unit which can be subsequently used forming a subsequence, which directly precedes the inverse image sequence, of an entire sequence which is generated by repeated formation of one-way function values starting from a starting value which is stored centrally on a key number-specific basis.

6. Vehicle security device according to claim 1 wherein a cryptographic hash function, in particular the RIPEMD function, is used as one-way function.

7. Vehicle security device according to claim 1 wherein a plurality of vehicle-end pieces of equipment is designed in parallel to determine the respective actual authorization information from an item of received user code information, to compare the same with the desired authorization information and to generate, as a function of the comparison, an item of use-enabling information.

8. Vehicle security device according to claim 7 wherein a locking control device of the vehicle forms a vehicle-end piece of equipment of the security device.

9. Vehicle security device according to claim 1 wherein:

respective transmitted user code information contains an item of vehicle-specific and an item of key-specific identification information; and the identification information of an item of received user code information can be evaluated in advance in a vehicle-end piece of equipment, the use-authorization testing process being aborted after non-authorizing transmitted identification data are detected.

10. Vehicle security device according to claim 1 wherein:

a plurality of authorizing, user-end key units are provided of a vehicle, which key units each transmit inverse image sequence that differ from one another;

items of transmitted user code information each contain an item of key identification information; and an item of specific desired authorization information are stored in a memory, which can be addressed with the aid of the key identification information, in each vehicle-end piece of equipment involved in the process for each key unit.

* * * * *